United States Patent
Atkins et al.

(10) Patent No.: US 6,721,457 B1
(45) Date of Patent: *Apr. 13, 2004

(54) METHOD FOR ENHANCING DIGITAL IMAGES

(75) Inventors: Brian Atkins, Mountain View, CA (US); Morgan Schramm, Portland, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/384,488

(22) Filed: Aug. 27, 1999

(51) Int. Cl.⁷ .................................................. G06K 9/40
(52) U.S. Cl. ...................... 382/260; 382/261; 382/199; 358/1.9
(58) Field of Search ................................ 382/260, 199, 382/239, 300, 261, 165; 358/1.2, 445, 1.9

(56) References Cited

U.S. PATENT DOCUMENTS

| | | | |
|---|---|---|---|
| 5,031,227 A | 7/1991 | Raasch et al. | 382/22 |
| 5,050,227 A | 9/1991 | Furusawa et al. | 382/54 |
| 5,247,588 A | 9/1993 | Komatsu et al. | 382/54 |
| 5,271,064 A | 12/1993 | Dhawan et al. | 382/54 |
| 5,283,671 A | 2/1994 | Stewart et al. | 358/532 |
| 5,343,283 A * | 8/1994 | van Dorsselaer et al. | 358/445 |
| 5,351,305 A | 9/1994 | Wood et al. | 382/6 |
| 5,390,264 A | 2/1995 | Ishihara et al. | 382/54 |
| 5,392,137 A | 2/1995 | Okubo et al. | 358/462 |
| 5,497,249 A | 3/1996 | Koizumi et al. | 358/462 |
| 5,585,934 A * | 12/1996 | Yoshimura et al. | 386/120 |
| 5,649,031 A | 7/1997 | Nakamura et al. | 382/254 |
| 5,819,035 A * | 10/1998 | Devaney et al. | 709/202 |
| 5,880,767 A | 3/1999 | Liu et al. | 347/251 |
| 5,974,190 A * | 10/1999 | Maeda et al. | 382/255 |
| 6,075,926 A * | 6/2000 | Atkins et al. | 358/1.2 |
| 6,392,759 B1 * | 5/2002 | Kuwata et al. | 358/1.9 |
| 6,404,932 B1 * | 6/2002 | Hata et al. | 382/239 |
| 6,466,702 B1 * | 10/2002 | Atkins et al. | 382/300 |
| 2002/0097912 A1 * | 7/2002 | Kimmel et al. | 382/199 |

FOREIGN PATENT DOCUMENTS

| | | |
|---|---|---|
| EP | 0531904 | 3/1993 |
| EP | 0531904 A2 | 3/1993 |
| JP | 63180264 | 7/1988 |
| JP | 07325916 | 12/1995 |

OTHER PUBLICATIONS

Giovanni Ramponi, "Nonlinear unsharp masking methods for image contrast enhancement" Jul. 1996 *Journal of Eectronic Imaging*, vol. 5(3), pp. 353–366.

Patent Abstracts of Japan, Publication No. 07–325916, Publication Date Dec. 12, 1995, 1 page.

Patent Abstracts of Japan, Publication No. 63–180264, Publication Date Jul. 25, 1988, 1 page.

Inspec Abstract Accession No. 5554035 & Proc. SPIE —Int. Soc. Opt. Eng. (USA) 1996, Vol 2959, pp. 174–185, (1 page included).

U. K. Search Report (3 pages).

A. Saad, et al.; "Adaptive Vectorial Speckle Filtering In SAR Images Based On A Fuzzy Clustering Criteria" Abstract; INSPEC/IEE, 1996.

British Search Report Dated Mar. 28, 2001.

* cited by examiner

Primary Examiner—Kimberly Williams
Assistant Examiner—Melanie M. Vida

(57) ABSTRACT

A method for improving the quality of arbitrary digital images with an input pixel window having an input pixel is provided to calculate variation in the pixel window, compare the variation in the pixel window to a predetermined threshold value, and process the input pixel based upon the comparison.

46 Claims, 7 Drawing Sheets

METHOD FOR ENHANCING DIGITAL IMAGES

FIELD OF THE INVENTION

The present invention relates to image processing in a computing system and more particularly, to a method for enhancing the quality of digital images.

BACKGROUND

Digital images are commonly used in today's computing world. However, the quality of these images vary widely. For example, some digital images are highly compressed JPEG files with artifacts, but others are of a very high quality. The inherent variation in the quality of digital images poses a challenge for image rendering devices, such as printers and computer monitors to accurately reproduce digital images.

Prior image processing techniques have been proposed for improving the quality of digital images. Conventional algorithms have been used for suppressing compression artifacts and also for restoring images that are distorted by various types of noise. However, applying an algorithm for suppressing compression artifacts to an image that does not have any artifacts will result in a degraded image. For example, if an algorithm for reducing JPEG artifacts is applied to a sharp image that does not have JPEG artifacts, it will result in a blurry image compared to the original image.

Other conventional image processing techniques have been proposed for enhancing images without excessive artifacts. Examples of such techniques are, unsharp masking algorithms for image sharpening and histogram transformations for enhancing image contrast. However, application of the foregoing processes to an image that does include artifacts will also result in image distortion.

Therefore, what is desired is a method for improving the quality of digital images with or without artifacts resulting in an enhanced image.

SUMMARY

The present invention addresses the foregoing by providing a method for improving arbitrary digital images with an input pixel window having an input pixel, including process steps to calculate variation in luminance of the pixel window, compare the variation in the luminance of the pixel window to a predetermined first threshold value and process the input pixel based upon the comparison. Thereafter, output pixel with pixel value equal to the input pixel values, if the luminance is less than the first threshold value; apply a moderate smoothing filter if the variation in luminance is greater than the first threshold value and less than a second predetermined threshold value; and apply a non-linear enhancement filter if the luminance variation is greater than the second threshold value.

By virtue of the foregoing aspects of the present invention, a filter is applied to a digital image based upon image content and that improves the quality of reproduced digital images.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
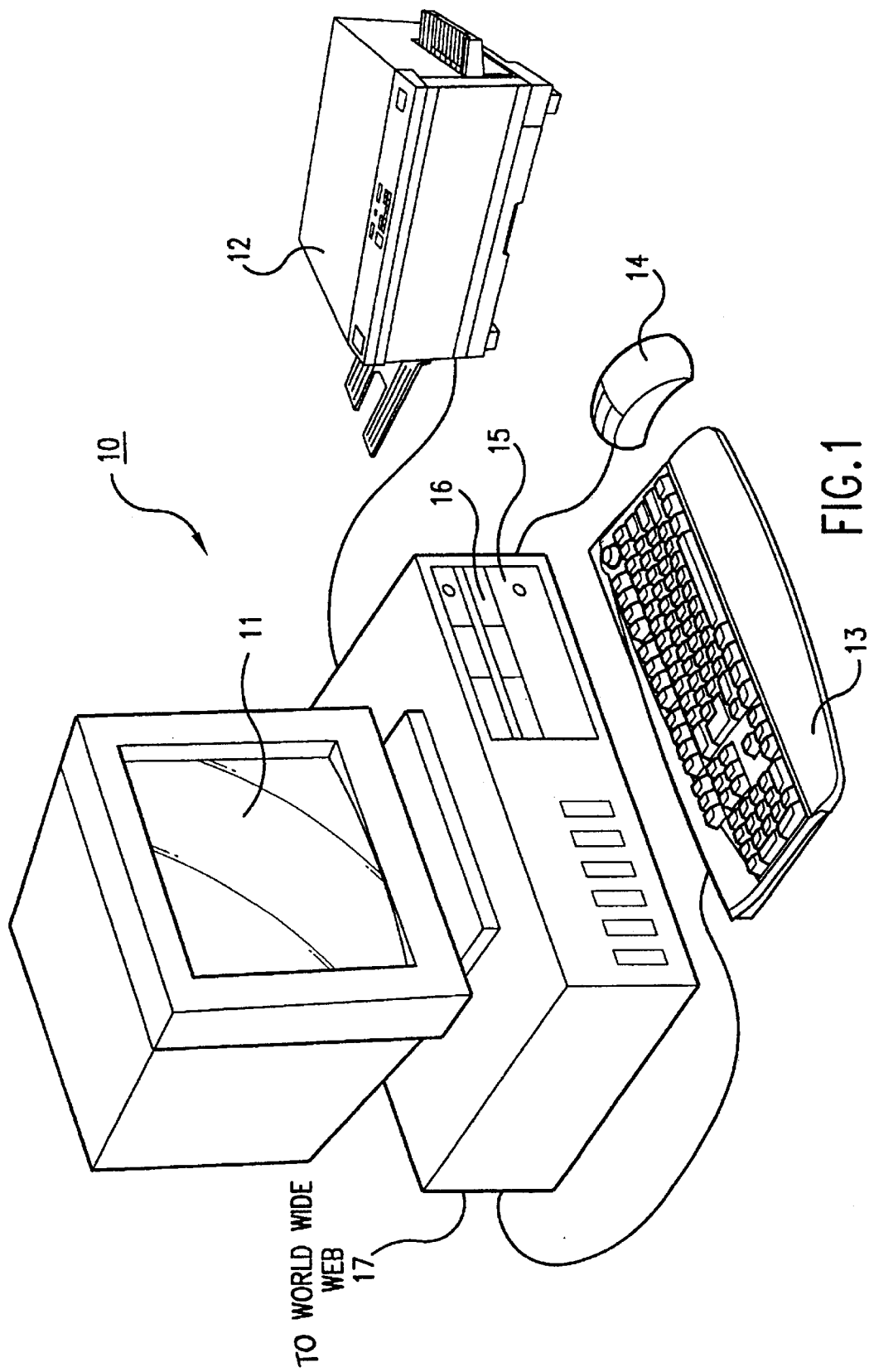
FIG. 1 illustrates a computing system to carry out the inventive technique.

FIG. 1 is a block diagram of a typical printing system, which includes a host computer 10, a monitor 11, and a printer 12. Monitor 11 may be a CRT type, a LCD type, or any other type of color or monochrome display. Printer 12 may be any type of printer such as an inkjet printer, laser printer, thermal printer, dot matrix, or the like. Also provided with computer 10 is a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 stores computer executable code embodying the present invention, and application programs by which computer 10 generates, manipulates and stores files on disk 15, displays data in those files on monitor 11, and prints data in those files via printer 12.

Device drivers are also stored on disk 15. One of the stored device drivers is a printer driver that provides a software interface to firmware in printer 12, thereby facilitating data transfer between computer 10 and printer 12.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files, device driver files and data files stored on a CD-ROM.

A modem, an integrated services digital network (ISDN) connection, or the like also provides computer 10 with an Internet connection 17 to the World Wide Web (WWW). The Internet connection 17 allows computer 10 to download device drivers, data files, image files, application program files, and computer-executable process steps embodying the present invention.

Figure 2:
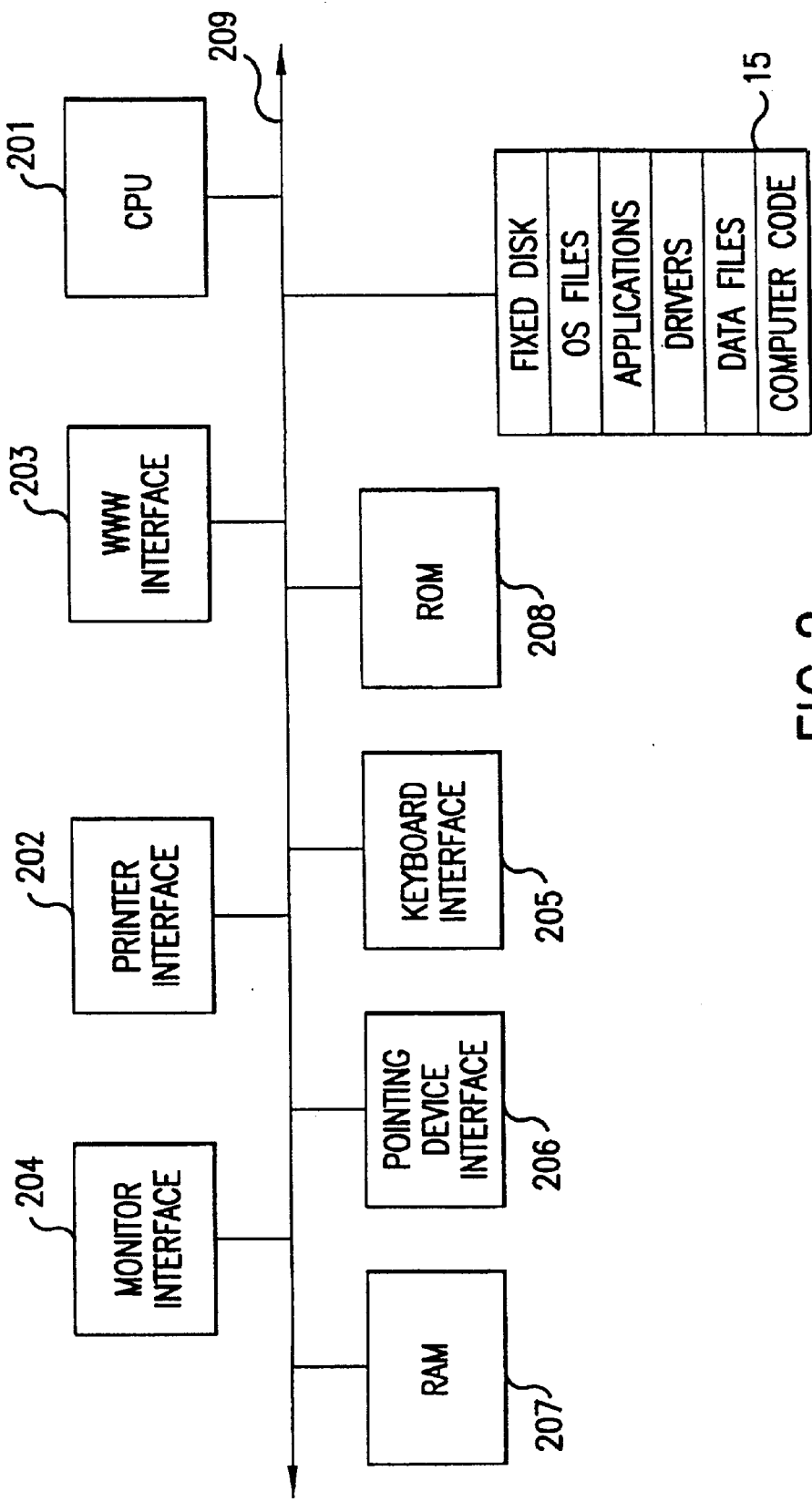
FIG. 2 is a block diagram of the architecture of the computing system of FIG. 1.

FIG. 2 is a block diagram showing the internal functional architecture of computer 10. As shown in FIG. 2, computer 10 includes a CPU 201 for executing computer-executable process steps and interfaces with a computer bus 209. Also shown in FIG. 2 are a printer interface 202, a WWW interface 203, a display device interface 204, a keyboard interface 205, a pointing device interface 206 and disk 15.

As described above, disk 15 stores operating system program files, application program files, and device drivers such as a printer driver for printer 12. Some of these files are stored on disk 15 using an installation program. For example, CPU 201 executes computer-executable process steps of an installation program so that CPU 201 can properly execute the application program.

A random access main memory ("RAM") 207 also interfaces to computer bus 209 to provide CPU 201 with access to memory storage. When executing stored computer-executable process steps from disk 15 (or other storage media such as floppy disk 16, or from files download via WWW connection 17), CPU 201 stores those process steps in RAM 207 and executes the stored process steps out of RAM 207.

Read only memory ("ROM") 208 is provided to store invariant instruction sequences such as start-up instruction sequences or basic Input/output operating system (BIOS) sequences for operation of keyboard 13.

Figure 3:
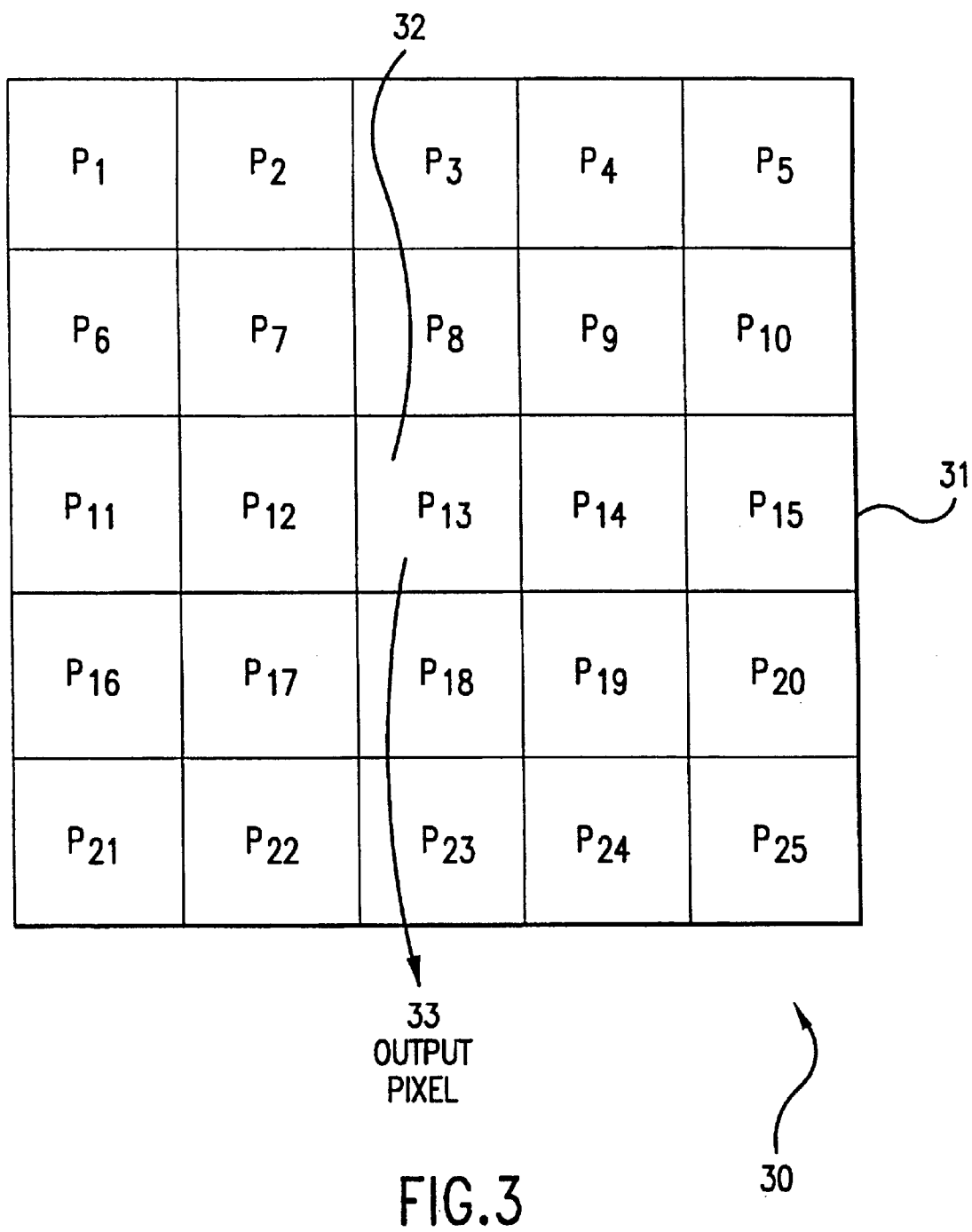
FIG. 3 illustrate a raster image with an input pixel window.

FIG. 3 is a representational view of a raster digital image 30 with input pixel window 31. As shown in FIG. 3, pixel window 31 comprises of pixels arranged in a two dimensional array. Each pixel of the raster image 30 has a color value which is stored in memory such as on disk 15 or in RAM 207. The number of bits for the color value is determined by the color space, for example, RGB, CMYK, LAB, and CIELAB etc. Frequently color is represented by 24 bits, that includes 8 bits for each of red, green and blue color. Furthermore, color can be represented in the CMYK-color space by 32 bits which includes 8 bits for each cyan, magenta, yellow and black color components. For illustration purposes, also shown in FIG. 3 is an input pixel 32 located in pixel window 31 whose output value ("output pixel 33") is determined according to one aspect of the present invention.

Figure 4:
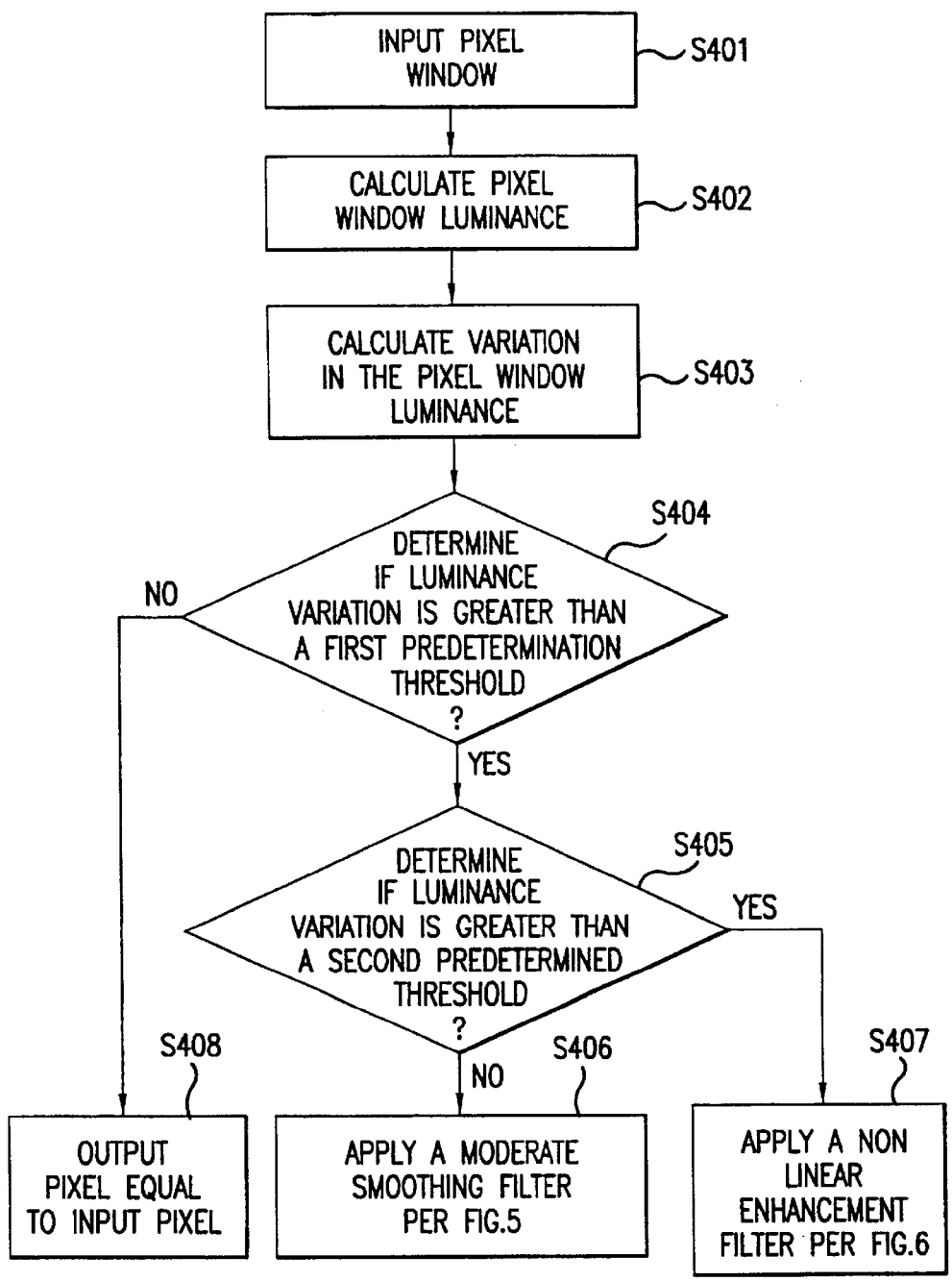
FIG. 4 is a basic flow chart showing computer executable process steps for enhancing arbitrary digital images.

FIG. 4 is a flow diagram showing process steps for enhancing arbitrary digital images according to one aspect of the present invention. The process steps of FIG. 4 are stored as computer code in RAM 207 and executed by CPU 201 or alternatively, stored on disk 15 and executed by CPU 201. Generally speaking, the process depicted in FIG. 4 analyzes the variation in input pixel window 31, applies a filter based upon the variation and outputs pixel values for an input pixel 32.

In more detail, step S401 obtains an input pixel window. For illustration purposes as shown in FIG. 3, input pixel window 31 is a 5×5 array comprising of 25 pixels with pixel P13, designated as the input pixel 32.

In step S402, calculate luminance for pixel window 31. The luminance (L) can be calculated by using the formula: L=0.299R+0.587G+0.114B where R, G and B are the red, blue and green components of the pixels. Luminance can also be calculated by other formulas based upon the color space.

Step S403, determines variation in input pixel window 31. Variation in input pixel window 31 may be determined by the difference between the maximum and minimum value of luminance of pixel window 31. Other factors, for example, hue and saturation can also be used to determine the variation in input pixel window 31.

Step 404, compares luminance variation of pixel window 31 to a predetermined threshold value (T1). If luminance variation is less than T1, then the process flow moves to Step S408, where input pixel value is equal to output pixel value.

Figure 5:
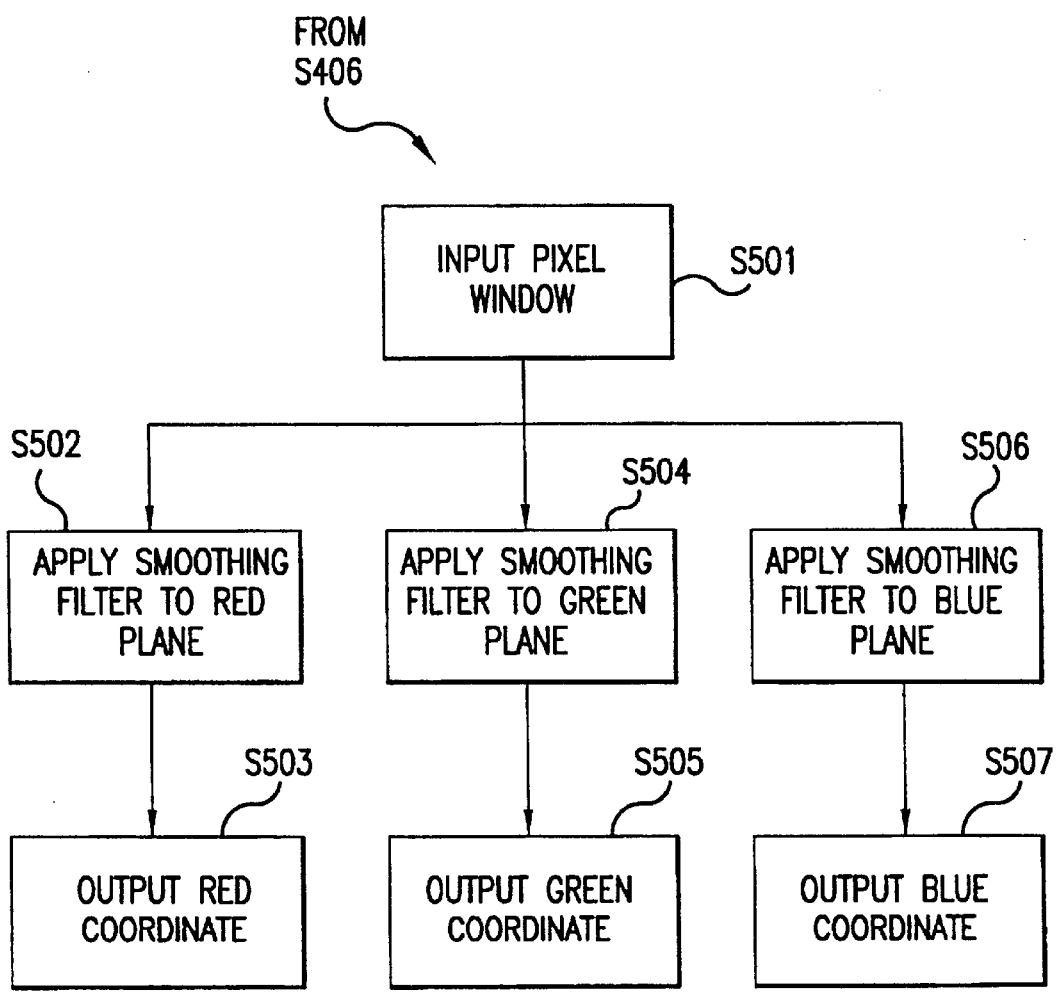
FIG. 5 is a basic flow chart showing computer executable process steps for applying a moderate smoothing filter to an input pixel window.
Figure 6:
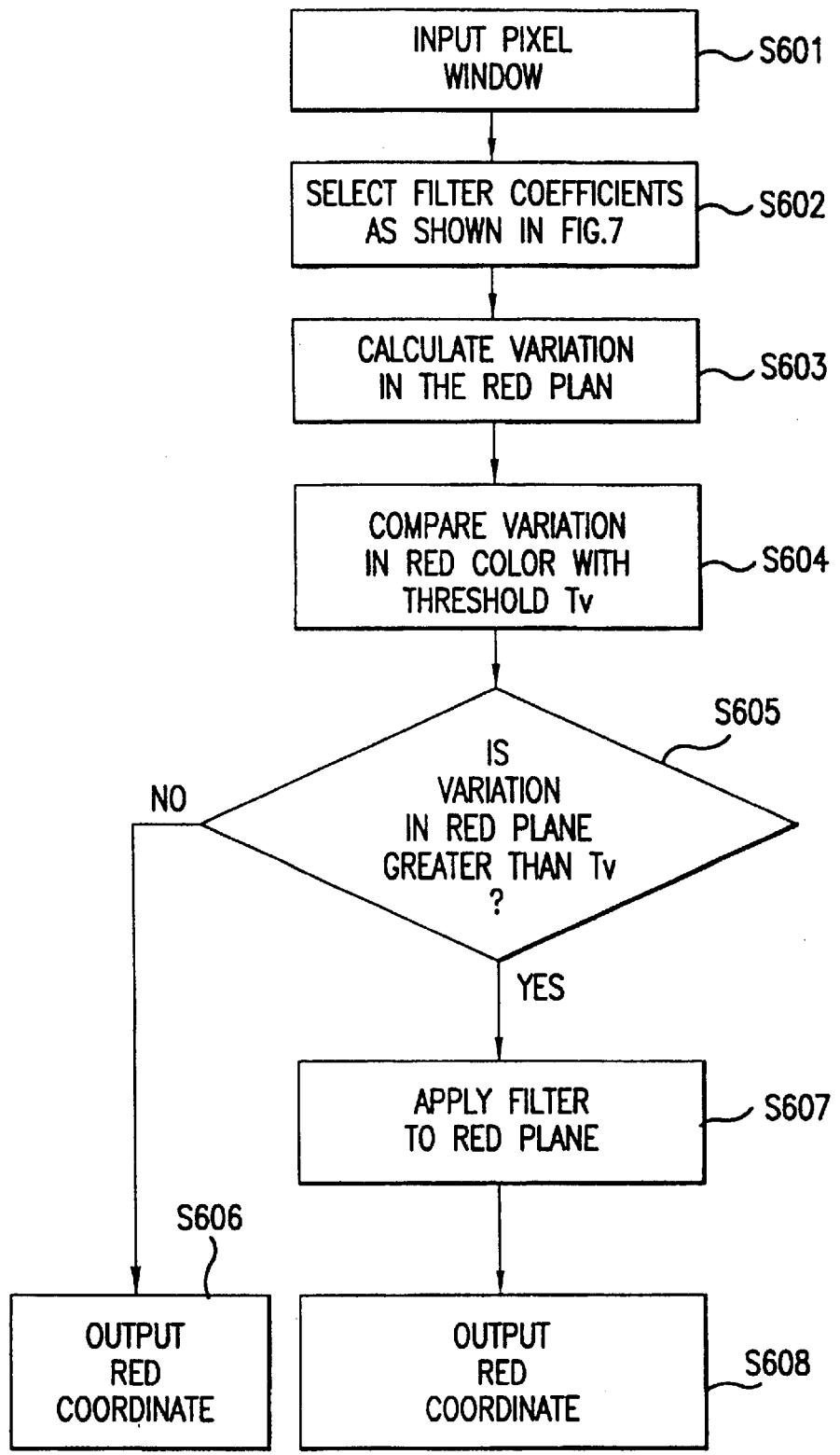
FIG. 6 is a flow diagram showing computer executable process steps for applying a non-linear enhancement filter to an input pixel window.

If luminance variation is greater than T1, then in step S405, luminance variation is compared to a second predetermined threshold (T$_2$). If luminance variation is less than T2, then in Step S406 a moderate smoothing filter as described in FIG. 5 is applied to input pixel window 31 to generate output pixel 33. If variation is greater than T2, then the process flow moves to step S407, where a non-linear enhancement filter, as described in FIG. 6 is applied to input pixel window 31 to generate output pixel 33.

Applying a Moderate Smoothing Filter

In Step S501, input pixel window 31 is received from Step S406, as described in FIG. 4.

In Step S502, apply a moderate smoothing filter to the red plane of pixel window 31. One such moderate smoothing filter with the coefficients given below are applied to a 3×3 array, where input pixel 32 is the center of the 3×3 array, as shown in FIG. 3.

Moderate Smoothing Filter Coefficients:

1/9, 1/9, 1/9

1/9, 1/9, 1/9

1/9, 1/9, 1/9

It is noteworthy, that the foregoing moderate smoothing filter coefficients are for illustration purposes only, another set of coefficients may be used to apply a moderate smoothing filter to input pixel window 31. Furthermore, the invention is not limited to a 3×3 array, any array size may be used for applying the moderate smoothing filter.

In Step 503, output red coordinate of output pixel 33.

In Step S504, apply a moderate smoothing filter to the green plane of pixel window 31 similar to the red plane discussed above. In Step S505 output green coordinate of output pixel 33.

In Step S506, apply a moderate smoothing filter to the blue plane of pixel window 31 similar to the red plane discussed above.

In Step S507, output the blue coordinate of output pixel 33.

Applying a Non-linear Enhancement Filter

FIG. 6 is a block diagram of computer executable process steps according to one aspect of the present invention for applying a non-linear enhancement filter when the variation in luminance of pixel window 31 is greater than T2, as shown in FIG. 4.

In step S601, input pixel window 31 received from Step S407 of FIG. 4.

Figure 7:
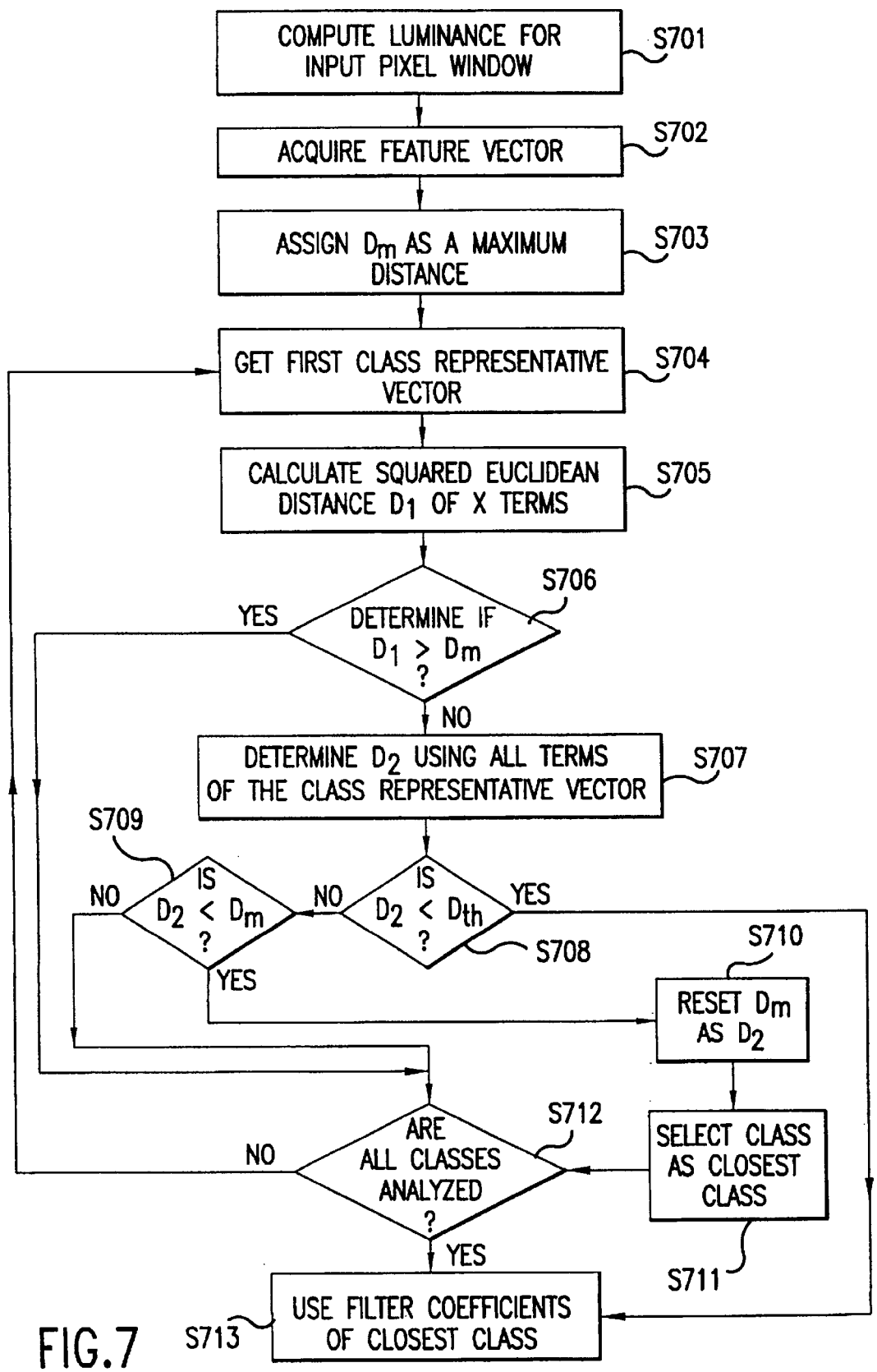
FIG. 7 is a flow diagram showing computer executable process steps for selecting filter coefficients used in the filter of FIG. 6.

In step S602, select filter coefficients as described in detail in FIG. 7.

In step S603, calculate variation in the red plane of pixel window 31. The variation in the red plane can be calculated by the difference between the maximum and minimum value of the red plane.

In Step S604, compare the variation of the red plane to a predetermined threshold value for the red plane, designated as $T_r$.

In Step S605, determine if variation in the red plane is greater than $T_r$. If variation in red plane is less than $T_r$ then in step S606, the red coordinate of output pixel 33 is equal to the red coordinate of input pixel 32. If variation in red plane is greater than $T_r$, then the process moves to Step S607 and filter coefficients obtained from FIG. 7 are applied to the red plane of the input pixel window 33.

In Step S608, output red-coordinate value for output pixel 33.

Steps similar to S603–S608 are applied to the green and blue planes of pixel window 31 to generate green and blue coordinates for output pixel 33 based on input pixel 32.

Determining Filter Coefficients

FIG. 7 is a block diagram of computer executable process steps according to one aspect of the present invention that describes filter selection process used for applying filter coefficients in FIG. 6. Generally, FIG. 7 describes process steps to extract a feature vector from the luminance component of input pixel window 31, and select a key vector of a representative class from a plurality of class representative vectors with corresponding filter coefficients, closest to the feature vector. The process for determining the set of key vectors with corresponding filter coefficients is described in applicants patent application Ser. No. 09/064,638 filed Apr. 21, 1998, titled "APPARATUS AND METHOD OF BUILDING AN ELECTRONIC DATABASE FOR RESOLUTION SYNTHESIS", incorporated herein by reference.

More particularly, in Step S701, compute luminance for pixel window 31 as described in step S402 of FIG. 4.

In Step S702, acquire luminance feature vector Y as described in applicant's patent application Ser. No. 09/064,638 filed Apr. 21, 1998, titled "APPARATUS AND METHOD OF BUILDING AN ELECTRONIC DATABASE FOR RESOLUTION SYNTHESIS", incorporated herein by reference. Other vectors using other features for describing a color image, for example, hue and saturation etc., may also be used to implement this aspect of the present invention.

In Step S703 assign a maximum Euclidean distance ($D_m$) for comparing a class representative vector to feature vector Y.

In Step S704, acquire a first class representative vector from a plurality of class representative vectors.

In Step S705, calculate the squared Euclidean distance $D_1$ between the first class representative vector and feature vector Y, using X number of N Terms of the first class representative vector.

In Step S706, compare $D_1$ with $D_m$ and determine if $D_1$ is greater than $D_m$. If $D_1$ is greater than $D_m$, the process moves to stop S712.

If $D_1$ is less than $D_m$, then in Step S707, calculate Squared Euclidean distance $D_2$ between the first class representative vector and feature vector Y, using N terms of the first class representative.

In Step S708, compare $D_2$ with a predetermined threshold distance $D_{th}$. If $D_2$ is less than $D_{th}$, then the process moves to Step S713.

If $D_2$ is greater than $D_{th}$, then in Step S709, determine if $D_2$ is less than $D_m$.

If $D_2$ is less than $D_m$, then in step S710, reset $D_m$ as $D_2$.

In Step S711, assign the first class where $D_2$ is less than $D_m$, as the current best class.

If $D_2$ is greater than $D_m$, then the process moves to step S712.

In Step S712, determine if all classes have been analyzed. If all classes are analyzed then the process flow moves to Step S713, where filter coefficients of the current best class are selected. If all the classes have not been analyzed, process moves back to Step S704 to analyze the next class representative vector, for example, the second class representative vector.

Although the present invention has been described with reference to specific embodiments, these embodiments are illustrative only and not limiting. Many other applications and embodiments of the present invention will be apparent in light of this disclosure and the following claims.

What is claimed is:

1. A method for improving arbitrary digital images with a pixel window having an input pixel, comprising:

calculating a variation in the pixel window;

calculating a first threshold value and a second threshold value;

comparing the variation to both the first threshold value and the second threshold value;

processing the input pixel based upon the comparison, wherein the output pixel value is equal to the input pixel value if the variation is less than the first threshold value and less than the second threshold value; wherein a smoothing filter is applied if the variation is greater than the first threshold value and less than the second threshold value, and wherein a non-linear filter is applied if the variation is greater than the first threshold value and greater than the second threshold value; and producing an output pixel based upon the processing of the input pixel.

2. The method of claim 1, wherein the pixel window comprises a red plane, further comprising:

applying a smoothing filter to the red plane of the pixel window.

3. The method of claim 1, wherein the pixel window comprises a green plane, further comprising:

applying a smoothing filter to the green plane of the input pixel window.

4. The method of claim 1, wherein the pixel window comprises a blue plane, further comprising:

applying a smoothing filter to the blue plane of the pixel window.

5. The method of claim 1, wherein the pixel window comprises a red plane, further comprising:

calculating a variation in the red plane of the pixel window.

6. The method of claim 1, wherein the pixel window comprises a green plane, further comprising:

calculating a variation in the green plane of the pixel window.

7. The method of claim 1, wherein the pixel window comprises a blue plane, further comprising:

calculating a variation in the blue plane of the pixel window.

8. The method of claim 5, further comprising:

comparing the variation in the red plane with a threshold value for the red plane; and determining whether the variation in the red plane is greater than the threshold value.

9. The method of claim 8, further comprising:

applying a plurality of filter coefficients to the red plane if the variation in the red plane is greater than the threshold value for the red plane.

10. The method of claim 6, further comprising:

comparing the variation in the green plane with a threshold for the green plane; and determining whether the variation in the green plane is greater than the threshold value.

11. The method of claim 10, further comprising:

applying a plurality of filter coefficients to the green plane if the variation in the green plane is greater than the threshold value for the green plane.

12. The method of claim 7, further comprising:

comparing the variation in the blue plane with a threshold value for the blue plane; and determining whether the variation in the blue plane is greater than the threshold value.

13. The method of claim 12, further comprising of:

applying a plurality of filter coefficients to the blue plane if the variation in the blue plane is greater than the threshold value for the blue plane.

14. The method of claim 1, wherein the variation in the pixel window is based upon luminance of the pixel window.

15. The method of claim 1, wherein the variation in the pixels window is based upon hue of the pixel window.

16. The method of claim 1, wherein the variation in the pixel window is based upon saturation of the pixel window.

17. The method of claim 1, further comprising:

acquiring a feature vector for the pixel window;

assigning a distance $D_m$ as a maximum distance;

acquiring a plurality of representative vectors with a plurality of terms; and calculating Squared Euclidean distance $D_1$ between a class representative vector and the feature vector, using X number of N terms of the class representative vector.

18. The method of claim 17, further comprising:

comparing the Squared Euclidean distance $D_1$ with $D_m$; and calculating a second Squared Euclidean distance $D_2$ between the feature vector and the class representative vector using N terms of the class representative vector if $D_1$ is less than $D_m$, wherein the feature vector is a luminance vector.

19. The method of claim 18, further comprising:

comparing $D_2$ with a threshold distance $D_{th}$; and using a plurality of filter coefficients of the best representative class with the Squared Euclidean distance $D_2$ less than the threshold distance $D_{th}$.

20. The method of claim 19, further comprising:

comparing $D_2$ with $D_m$ and if $D_2$ is less than $D_m$ assigning $D_2$ as the minimum distance $D_m$; and selecting the class with $D_2$ less than $D_m$ as the class closest to the feature vector.

21. The method of claim 18, further comprising:

verifying if all the vector classes have been analyzed if $D_1$ is greater than $D_m$.

22. The method of claim 20, further comprising:

verifying if all the vector classes have been analyzed if $D_2$ is greater than $D_m$.

23. A computer-readable medium storing computer-executable process steps for use in a computer system for improving arbitrary digital images with a pixel window having an input pixel, the process steps comprising:

calculating variation in the pixel window;

calculating a first threshold value and a second threshold value;

comparing the variation to both the first threshold value and the second threshold value;

processing the input pixel based upon the comparison, wherein the output pixel value is equal to the input pixel value if the variation is less than the first threshold value and less than the second threshold value, wherein a smoothing filter is applied if the variation is greater than the first threshold value and less than the second threshold value, and wherein a non-linear filter is applied if the variation is greater than the first threshold value and greater than the second threshold value; and producing an output pixel based upon the processing of the input pixel.

24. Computer executable process steps of claim 23, wherein the pixel window comprises a red plane, further comprising:

applying a smoothing filter to the red plane of the pixel window.

25. Computer executable process steps of claim 23, wherein the pixel window comprises a green plane, further comprising:

applying a smoothing filter to the green plane of the input pixel window.

26. Computer executable process steps of claim 23, wherein the pixel window comprises a blue plane, further comprising:

applying smoothing filter to the blue plane of the pixel window.

27. Computer executable process steps of claim 23, wherein the pixel window comprises a red plane, further comprising:

calculating a variation in the red plane of the pixel window.

28. Computer executable process steps of claim 23, wherein the pixel window comprises a green plane, further comprising:

calculating a variation in the green plane of the pixel window.

29. Computer executable process steps of claim 23, wherein the pixel window comprises a blue plane, further comprising:

calculating a variation in the blue plane of the pixel window.

30. Computer executable process steps of claim 27, further comprising:

comparing the variation in the red plane with a threshold value for the red plane; and determining if variation in the red plane is greater than the threshold value.

31. Computer executable process steps of claim 30, further comprising:

applying a plurality of filter coefficients to the red plane if the variation in the red plane is greater than the threshold value for the red plane.

32. Computer executable process steps of claim 28, further comprising:

comparing the variation in the green plane with a threshold value for the green plane; and determining whether the variation in the green plane is greater than the threshold value.

33. Computer executable process steps of claim 32, further comprising:

applying a plurality of filter coefficients to the green plane if the variation in the green plane is greater than the threshold value for the green plane.

34. Computer executable process steps of claim 29, further comprising:

comparing the variation in the blue plane with a threshold value for the blue plane; and determining whether the variation in the blue plane is greater than the threshold value.

35. Computer executable process steps of claim 34, further comprising:

applying a plurality of filter coefficients to the blue plane if the variation in the blue plane is greater than the threshold for the blue plane.

36. Computer executable process steps of claim 23, wherein the variation in the pixel window is based upon a luminance of the pixel window.

37. Computer executable process steps of claim 23, wherein the variation in the pixel window is based upon a hue of the pixel window.

38. Computer executable process steps of claim 23, wherein the variation in the pixel window is based upon a saturation of the pixel window.

39. Computer executable process steps of claim 23, further comprising:

acquiring a feature vector for the pixel window;

assigning a distance $D_m$ as maximum distance;

acquiring a plurality of representative vectors with a plurality of terms; and calculating Squared Euclidean distance $D_1$ between a class representative vector and the feature vector, using X number of N terms of the class representative vector.

40. Computer executable process steps of claim 39, further comprising:

comparing the Squared Euclidean distance $D_1$ with $D_m$; and calculating a second Squared Euclidean distance $D_2$ between the feature vector and the class representative vector using N terms of the class representative vector if $D_1$ is less than $D_m$, wherein the feature vector is a luminance vector.

41. Computer executable process steps of claim 40, further comprising:

comparing $D_2$ with a threshold distance $D_{th}$; and using a plurality of filter coefficients of the representative class if the second Squared Euclidean distance $D_2$ less than the threshold distance $D_{th}$.

42. Computer executable process steps of claim 41, further comprising:

comparing $D_2$ with $D_m$ and if $D_2$ is less than $D_m$ assigning $D_2$ as the minimum distance $D_m$; and selecting the class with $D_2$ less than $D_m$ as the class closest to the feature vector.

43. Computer executable process steps of claim 40, further comprising:

verifying if all the vector classes of vector have been analyzed if $D_1$ is greater than $D_m$.

44. Computer executable process steps of claim 42, further comprising:

verifying if all the vector classes have been analyzed if $D_2$ is greater than $D_m$.

45. Computer executable process steps of claim 41, further comprising:

using the filter coefficient of the class closest to feature vector $D_2$ less than $D_{th}$.

46. The method of claim 19, further comprising:

using filter coefficients of the class closest to the feature vector with $D_2$ less than $D_{th}$.

* * * * *